United States Patent
May (10) Patent No.: US 8,209,117 B2
(45) Date of Patent: Jun. 26, 2012

(54) METHOD AND SYSTEM FOR LATITUDE ADAPTIVE NAVIGATION QUALITY ESTIMATION

(75) Inventor: Reed R. May, Seminole, FL (US)

(73) Assignee: Honeywell International Inc., Morristown, NJ (US)

( * ) Notice: Subject to any disclaimer, the term of this patent is extended or adjusted under 35 U.S.C. 154(b) by 280 days.

(21) Appl. No.: 12/630,403

(22) Filed: Dec. 3, 2009

(65) Prior Publication Data

US 2011/0137560 A1 Jun. 9, 2011

(51) Int. Cl.
*G01C 21/00* (2006.01)
(52) U.S. Cl. .......................................................... 701/220
(58) Field of Classification Search .................. None
See application file for complete search history.

(56) References Cited

U.S. PATENT DOCUMENTS

| | | | |
|---|---|---|---|
| 4,930,085 A | 5/1990 | Kleinschmidt | |
| 5,789,671 A | 8/1998 | Fernandez | |
| 6,249,745 B1 | 6/2001 | Hsu et al. | |
| 7,481,109 B2 | 1/2009 | Moore et al. | |
| 8,024,119 B2 * | 9/2011 | Zeng et al. | 701/511 |
| 2005/0234644 A1 * | 10/2005 | Lin | 701/214 |
| 2007/0282529 A1 * | 12/2007 | Thompson et al. | 701/220 |
| 2009/0048779 A1 * | 2/2009 | Zeng et al. | 701/214 |
| 2009/0248301 A1 * | 10/2009 | Judd et al. | 701/213 |

OTHER PUBLICATIONS

Mayhew, "Multi-Rate Sensor Fusion for GPS Navigation Using Kalman Filtering ", May 1999, pp. 1-120, Publisher: Virginia Polytechnic Institute and State University, Published in: Blacksburg, Virginia.
Rios et al, "Fusion Filter Algorithm Enhancements for a MEMS GPS/IMU", "Proceedings of the 2002 National Technical Meeting of the Institute of Navigation", Jan. 28-30, 2002.

* cited by examiner

*Primary Examiner* — Thomas Tarcza
*Assistant Examiner* — Nagi Murshed
(74) *Attorney, Agent, or Firm* — Fogg & Powers LLC (57) ABSTRACT

A method and system for navigation quality estimation is provided. The method comprises obtaining an alignment observation, comparing the alignment observation to a current heading estimate, and updating the current heading estimate based on the comparison. A heading error estimate is updated based on the updated current heading estimate, and an estimated drift rate is determined based on the heading error estimate and an operational latitude. A determination is then made whether a drift rate requirement is met by the estimated drift rate. If the drift rate requirement is not met, the method is repeated until the drift rate requirement is met.

19 Claims, 5 Drawing Sheets

METHOD AND SYSTEM FOR LATITUDE ADAPTIVE NAVIGATION QUALITY ESTIMATION

BACKGROUND

An inertial navigation system is required to provide some indication of expected navigation performance during an alignment operation. The commonly used indicator is the current heading variance from a Kalman filter, which makes statistically optimal estimates of a quantity using observations about the quantity and the associated uncertainty in the observations. The Kalman filter also maintains an uncertainty value (standard deviation) of the error in its estimated value of the quantity. As the Kalman filter runs, the uncertainty in its estimate decreases such that the estimate converges on the "correct" value.

In a gyro-compassing alignment operation, an inertial gyro platform is aligned to true north using the rotation of the earth. Generally the alignment time is specified (e.g., four minutes is typical for military systems), and the time is extended for higher latitudes in order to meet all specified performance parameters.

During an in-motion alignment operation, the inertial gyro platform is aligned to true north using a north/east velocity aiding source from another aligned navigator, Doppler data, Global Positioning System (GPS) data, or the like. Aligning to data supplied by another navigator is often called a "transfer alignment." For GPS-aided in-motion alignments, fixed values for the Kalman filter heading error are used to indicate "DEGRADED NAV READY" or "NAV READY" conditions. However, for in-motion alignments aboard ships, Doppler radar, or other forms of velocity-matching techniques at higher latitudes, it is often not possible to reach the level of Kalman filter heading errors, even though the system navigation capability has been reached.

SUMMARY

A method and system for navigation quality estimation is provided. The method comprises obtaining an alignment observation, comparing the alignment observation to a current heading estimate, and updating the current heading estimate based on the comparison. A heading error estimate is updated based on the updated current heading estimate, and an estimated drift rate is determined based on the updated heading error estimate and operational latitude. A determination is then made whether a drift rate requirement is met by the estimated drift rate. If the drift rate requirement is not met, the method is repeated until the drift rate requirement is met.

BRIEF DESCRIPTION OF DRAWINGS

The drawings depict only representative embodiments of the invention and are not to be considered limiting in scope. These embodiments will be described with additional specificity and detail in the following description through the use of the referenced drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

The present invention relates to a method of latitude adaptive navigation quality estimation for an inertial navigation system, also referred to herein as an inertial navigator. In general, the present method considers both latitude and estimated heading error to predict navigation performance. In one approach, the present method uses a heading uncertainty for a latitude dependent estimation of align quality (drift rate). The present method also provides a net effect on expected alignment time and residual heading error as a function of latitude, given a fixed level of drift rate performance.

An inertial navigator must be aligned to true north before it can be used to navigate. The alignment is typically done using a Kalman filter and iteratively processing observations that allows the Kalman filter to progressively correct its attitude data. The iteratively processing observations include comparing what the inertial sensors are reporting with some known external parameters, such as earth rate, north-east (N-E) velocities, Doppler radar velocities, and the like. There are a few options for determining when the alignment is complete.

In the fixed time method, the Kalman filter converges the heading to a value that is accurate enough to support a specified drift rate and heading error, after some period of time. This method only works when the observation noise is constant and predictable, like in a gyro-compassing alignment or some cases of transfer alignments. A similar method, known as the latitude dependent time method, estimates an extended alignment time at a given latitude.

In the fixed heading error method, the heading uncertainty from the Kalman filter is watched as alignment progresses until the heading uncertainty reaches an appropriate level. This is the only real option when the observation noise is not constant (varies observation to observation) or the aiding data is intermittent or interrupted during the alignment process.

The present method is applicable to the case when a specified navigation drift performance is needed. The present method employs a mathematical formula or small table of values, and interpolation of data, to generate correct heading error thresholds for a current latitude position. The formula can be derived empirically, and relates residual heading error of an inertial navigator during alignment to a given value of drift performance over a wide range of operational latitudes. The formula describes the expected heading error required to achieve degraded and full navigation performance as a function of latitude. This allows the inertial navigator to correctly and accurately indicate to an onboard crew when the navigator is sufficiently aligned to meet predefined levels of navigation performance under all conditions.

The formula in the present approach can be used to relate the expected drift rate and operational latitude to the current heading uncertainty being reported by a Kalman filter during an alignment process. The formula is designed to minimize alignment time with respect to the navigation drift rate and usually requires the user to allow relief on the specified heading accuracy at higher latitudes. The results achieved in using the formula can be employed in deciding when some specified navigation performance is reached, such as "DEGRADED NAV READY" and "NAV READY" under in-motion alignment situations such as Doppler, ship-board inertial navigation system (SINS), manual handset, and the like. In these situations, the user typically wants the navigator to declare "NAV READY" or "DEGRADED NAV READY" within a minimum time.

The present method is beneficial as it allows users to minimize the time spent in inertial navigator alignment to achieve a desired drift rate given the operational latitude. The method does this by exploiting offsetting effects found in terrestrial navigation, where at higher latitudes, the reduced earth-rate slows convergence of the heading alignment process, but simultaneously reduces the component of drift error due to poorer heading alignment during navigation. The present approach can be applied to various alignment situations.

The present technique is particularly useful in velocity matching alignment techniques, such as Doppler or gyro compass alignments, where it may not be possible for the inertial navigator to align to the equatorial heading error at higher latitudes. Since it is often a main objective to meet a specified drift performance, and not a heading error value, the present method allows the user to know when a needed drift performance has been reached by examining the Kalman filter heading uncertainly and the current latitude.

Various aspects of the present method and system are described in further detail hereafter with reference to the drawings.

Figure 1:
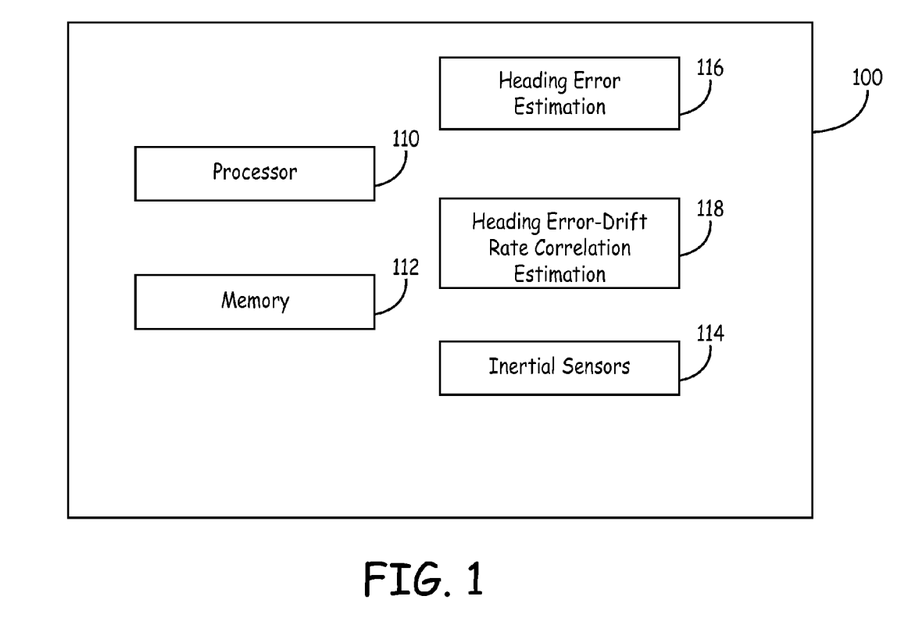
FIG. 1 is a block diagram of an apparatus for predicting navigation performance according to one embodiment, which can be used in an inertial navigation system.

FIG. 1 depicts an apparatus 100 for predicting navigation performance according to one embodiment, which can be employed in an inertial navigation system. The apparatus 100 includes at least one processor 110, and at least one memory device 112 in operative communication with processor 110. The apparatus 100 also includes one or more inertial sensors 114 in operative communication with processor 110 and memory device 112. The inertial sensors 114 can include one or more gyroscopes, accelerometers, or combinations thereof. A heading error estimation module 116, such as a Kalman filter, is configured to determine a heading error estimate based on input from inertial sensors 114. A heading error-drift rate correlation estimation module 118 is configured to determine an estimated drift rate based on the heading error estimate and an operational latitude.

In calculating the heading uncertainty, the heading error estimation module 116 uses Kalman Filtering techniques to refine the heading angle estimate and simultaneously produce a statistical estimate of the heading error. This represents the standard "alignment" process performed by gyro-compassing or other alignment techniques.

In calculating the estimated drift rate, the heading error-drift rate correlation estimation module 118 utilizes passed values for the current operational latitude, and the current heading uncertainty. The heading error-drift rate correlation estimation module 118 returns the estimated drift rate that would result if the inertial navigator went to navigation in the present state.

A drift rate specification, such as Circular Error Probable Rate (CEPR), is employed in the present method and system. The CEPR is an expression of drift rate using Circular Error Probable (CEP) as the distance error, and carries units of nautical miles per hour (nm/hr). While specifications for azimuth error and velocity error are useful metrics, the average positional drift rate defines the navigational performance.

In one approach of the present method, the circular error probable rate (estimated drift rate) can be calculated using a formula of the form:

$$\text{CEPR} = x \cdot \sigma_{Heading} \cdot \cos(y \cdot \text{abs}(\text{latitude}) + z) \quad (1)$$

where CEPR represents the circular error probable rate, $\sigma_{Heading}$ represents the heading uncertainty (error), abs(latitude) represents the absolute value of the operational latitude in degrees, and variables x, y, and z represent numerical values that can be determined empirically based on trial and error testing, and interpolation of data. For example, the CEPR can be calculated to have an upper boundary of about 5 nm/hr and a lower boundary of about 0.8 nm/hr using the CEPR equation (1).

The foregoing equation (1) can be rearranged to give a solution for minimum heading error given the desired CEPR and latitude:

$$\sigma_{Heading} = (1/x) \cdot \text{CEPR} \cdot \sec(y \cdot \text{abs}(\text{latitude}) + z) \quad (2)$$

Figure 3:
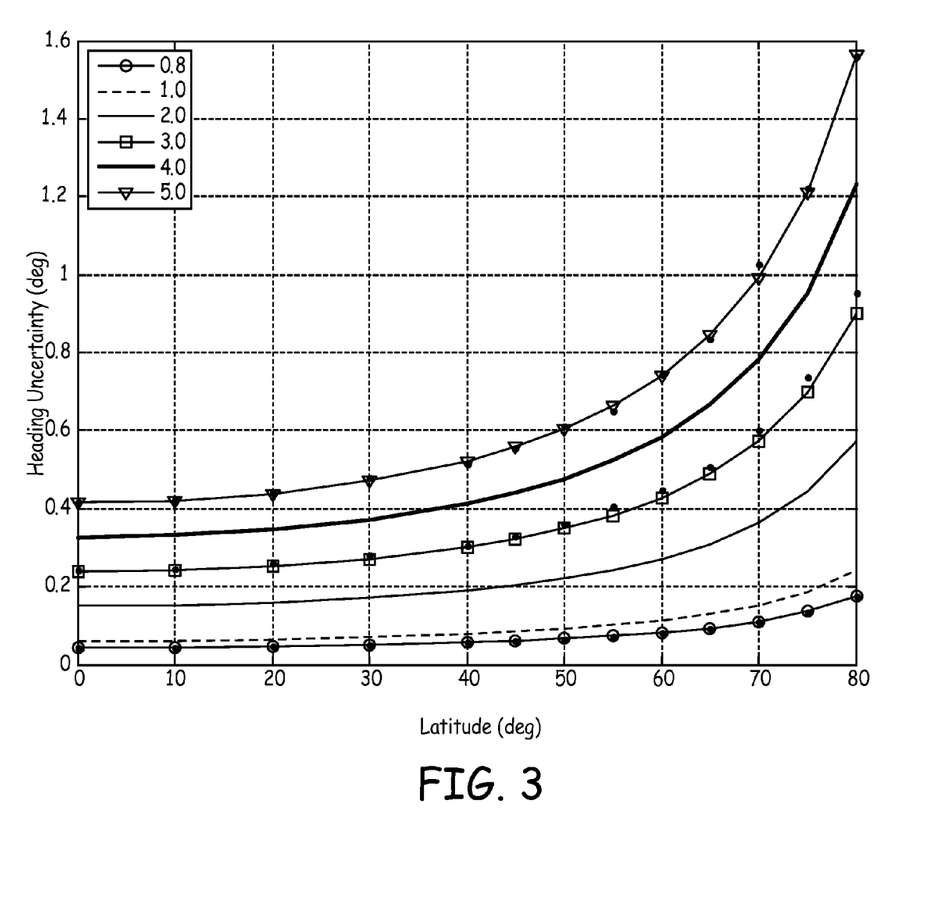
FIG. 3 is a graphical plot showing curve-fits and interpolations against simulation results.

A set of solutions using equation (2) are shown in the plot of FIG. 3. One curve fit is done for a large drift rate of 5 nm/hr and another is done for a nominal rate of 0.8 nm/hr by determining appropriate x, y, z values for the generalized secant formula shown above. All other values between those curves can be calculated by linear interpolation. In this example, the interpolated 3 nm/hr curve is shown plotted over actual data points derived from a simulation to demonstrate the accuracy of the linear interpolation method. This technique allows accurate estimates of heading error over a very large operational envelope of latitude and drift rate. Generally, DEGRADED NAV READY is defined at 3 or 5 nm/hr, while NAV READY is defined at 0.8 nm/hr. The curve-fit formula can be adjusted to best fit the data points visually or mathematically in the least-squares sense. The formula was selected for its simplicity, but polynomial or exponential forms can also give satisfactory results. Look-up tables could also be used if transcendental functions cannot be easily evaluated by the real-time system. Generally, this is not an issue, plus the equation/interpolation only need to be evaluated once given the desired drift rate and current latitude.

Figure 2:
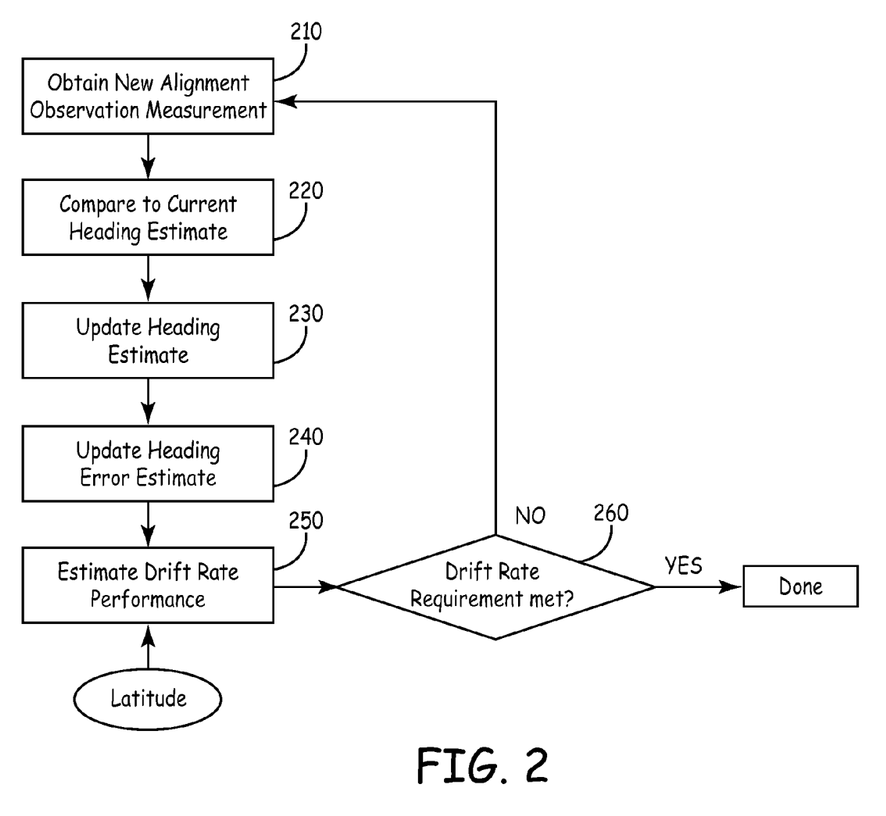
FIG. 2 is a process flow diagram for a method of navigation quality estimation according to one approach.

FIG. 2 is a process flow diagram for a method of navigation quality estimation according to one approach. Initially, a new alignment observation is obtained (block 210) and compared to a current heading estimate (block 220). The current heading estimate is updated based on the comparison (block 230). Any common alignment observation can be employed in the process of FIG. 2. For example, alignment observations can be obtained from Doppler, GPS, Gyro Compass, Transfer Aligns, Star Tracker, or the like.

A heading error estimate is then updated based on the updated current heading estimate (block 240). An estimated drift rate performance is determined based on the updated heading error estimate and an operational latitude (block 250). The estimated drift rate performance can be calculated using the CEPR equation discussed previously. A determination is then made whether a specified drift rate requirement is met by the estimated drift rate performance (block 260). If the specified drift rate requirement is not met, the foregoing steps are repeated until the drift rate requirement is met.

The following examples illustrate various aspects of the present invention and are not intended to limit the scope thereof.

EXAMPLES

The aggregate navigation performance of a typical inertial navigation system (INS) was studied using a covariance analysis program designed for that purpose. This program supports detailed modeling of the inertial sensors, aiding sources, and flight dynamics. A test scenario was constructed to represent typical flight dynamics for a helicopter application, using a standard military inertial package. Gyro-compassing alignments were used as the alignment method for simplicity since many align-time iterations were required for each latitude/drift rate data point.

Simulations

The simulated GC alignments were done at selected latitudes ranging from 0 to 80 degrees north using a selected flight trajectory for a helicopter and selected sensor error budgets for military quality sensors. A method of trial and error was used to find the alignment time for each latitude that resulted in a drift rate performance (CEPR) of 0.8 nautical miles per hour (nm/hr) for declaring "NAV READY" as well as 5 nm/hr and 3 nm/hr drift rates for declaring "DEGRADED NAV READY" performance levels. The alignment time and the subsequent heading error at the end of the alignment were recorded.

The objective of the simulations was to find the minimum alignment times and resulting heading errors at the end of the alignment that produced the specified drift performance of 0.8 nm/hr as the alignment latitude was varied. In the simulations, there was no substantial difference between north and south latitudes, so only northern latitudes were evaluated.

The exact alignment time needed at each test latitude to produce the desired CEPR was found by trial and error. The data produced from multiple simulations shows the combined effect of latitude on alignment time and true heading accuracy while navigational accuracy was held constant.

The error budgets used for the simulations were typical of a military grade inertial navigation system. The value used for CEPR is calculated from the CEP position errors reported from the covariance analysis program. The rate value is the slope of a least-squares fit of the CEP data points over the first hour of navigation with the special requirement that the fit-line pass through zero at navigation time=0.

Simulation Results

FIG. 3 is a graphical plot depicting the final results of hundreds of covariance simulations and data post-processing runs. The graphical plot shows the simulation points and curve fit equations for 0.8 nm/hr and 5.0 nm/hr data, and a series of interpolations to other drift rate values between 0.8 and 5.0 nm/hr. The plot in FIG. 3 shows the relationships between residual heading error (heading uncertainty), operational latitude, and a one-hour drift rate performance. FIG. 3 indicates that the interpolation for the 3.0 nm/hr data is very close to the simulation data. The interpolation is a bit conservative which is fine, meaning it "requires" a slightly lower heading error than may actually be needed to achieve a 3 nm/hr drift rate.

One conclusion that can be made regarding the foregoing data is that alignment time, heading accuracy, and drift performance, are non-linearly interrelated and are dependent on operational latitude. Thus, only one of the alignment time, heading accuracy, and drift performance can be treated as an independent variable.

Comparison to Current Estimators

Conventional military grade inertial navigation systems provide two Align Quality (AQ) equations, which are listed in Table 1, for the fixed heading error method and the Carrier Aircraft Inertial Navigation System (CANS) method. This section compares the estimations of these two equations to the simulation results used to construct the AQ equation in the Fixed Drift Rate method. The values produced are interpreted to be "nm/hr" and are used to estimate the navigation performance as the IMA (in-motion-alignment)/SNS alignment process progresses.

TABLE 1

| Method | Align Quality (AQ) Equation |
|---|---|
| Fixed Heading Error | CEPR = 13.9310 * $\sigma_{Heading}$ |
| CAINS | CEPR = 9.4771 * $\sigma_{Heading}$ * cos(latitude) |
| Fixed Drift Rate | CEPR = 18.3 * $\sigma_{Heading}$ * cos(.892 * abs(latitude) + 4.4) |

Figure 4:
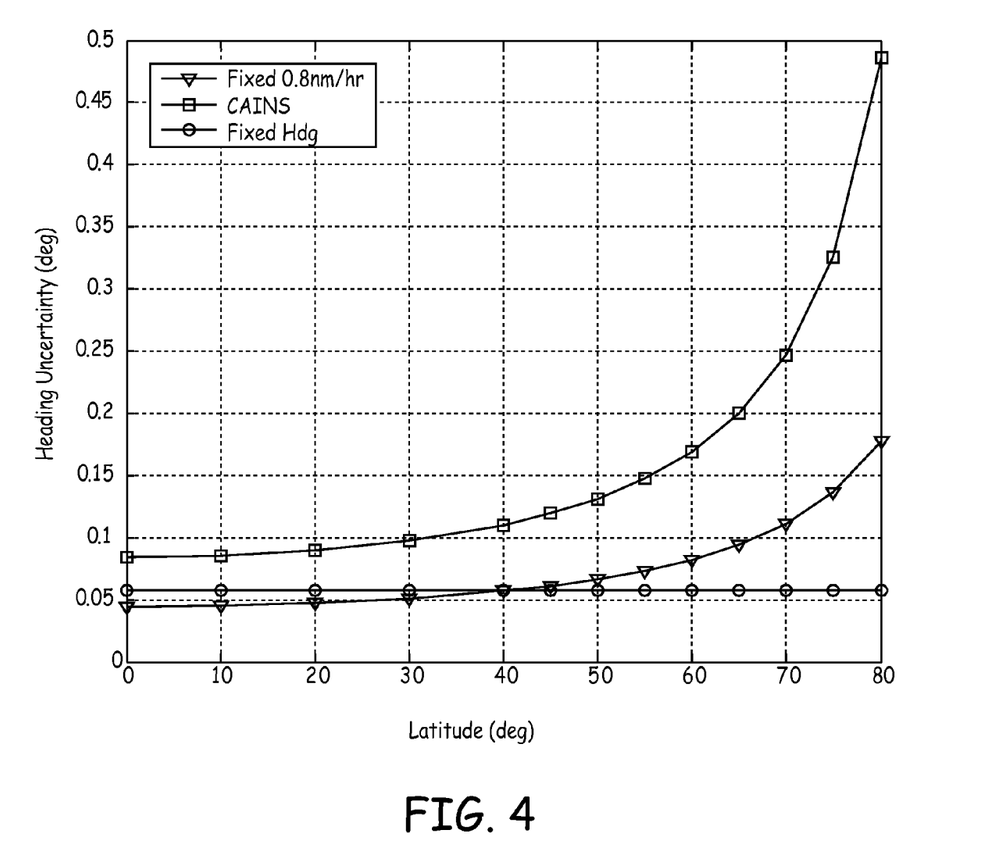
FIG. 4 is a graphical plot showing a comparison of drift performance estimators.

FIG. 4 is a graphical plot showing a comparison of drift performance estimators. This plot was generated by fixing the navigation performance to 0.8 nm/hr and solving for the predicted heading uncertainty needed to meet that performance using the Fixed Heading Error AQ equation, the CANS AQ equation, and the simulation results. The "Fixed 0.8 nm/hr" curve in FIG. 4 shows the relationship between heading error and latitude when achieving 0.8 nm/hr drift performance from the simulations. The "CAINS" curve shows this same relationship based on the AQ equation used in the CANS method. The "Fixed Hdg" line shows the constant 0.057 degree value.

As shown in FIG. 4, the CANS equation is too optimistic. For example, the CANS estimate would indicate 0.8 nm/hr performance at 30 degrees latitude when the Kalman filter heading uncertainty (sigma) was 0.097 degree. As shown by the simulation, the heading error needs to be down to 0.062 degree, using a real reference trajectory. The fixed heading error estimate is fairly good for the lower latitudes of less than about 45 degrees. As the latitude increases, the fixed heading error estimate gets too pessimistic, requiring smaller than necessary heading errors to achieve 0.8 nm/hr drift performance, which will greatly extend time in alignment.

It should be noted that the Fixed Drift Rate AQ equation was built using data collected around the CEPR value of 0.8 nm/hr for military-grade sensors. CEPR is not solely a factor of heading error and will not behave linearly across large ranges of CEPR values. It should also be noted that in these equations all angle quantities are in degrees. The absolute value of latitude is taken since an offset term is being added to the latitude angle. Otherwise, the values computed for southern latitudes would be incorrect.

Using the 5 nm/hr data and the 0.8 nm/hr data from the simulations, it is possible to construct a generalized performance estimate that is fairly accurate between those two CEPR limits. The formulation can be constructed to calculate the heading error needed for a given latitude and desired drift rate, or to calculate the estimated drift rate at a given latitude and current Kalman filter heading uncertainty. The present technique can use the fitted equations for the 0.8 nm/hr data and the 5 nm/hr data as the outer boundaries, and interpolate between these boundaries at the current latitude value.

Comparison of Alignment Times and the Secant Rule

It is a common practice to extend the alignment time for higher latitudes (e.g., 60 degree limits are shown in this example, with nominal align time of 4.0 minutes). The following formula is useful for latitudes up to about 80 degrees:

$$\text{AlignTime}(\text{latitude}) = 4.0 * \cos(60) * \text{secant}(\text{latitude})$$

This function is included here for reference to show how it relates to the other alignment times found in the simulation. The tabulated value for each latitude used in the study is shown in Table 2. Generally, the secant rule is intended to maintain the system heading accuracy specification as well as minimum drift rate.

TABLE 2

Extended Alignment Times Using the Secant Rule

| Latitude (deg) | 60-degree Secant Rule (sec) |
| --- | --- |
| 0.00 | 240.0 |
| 10.00 | 240.0 |
| 20.00 | 240.0 |
| 30.00 | 240.0 |
| 40.00 | 240.0 |
| 45.00 | 240.0 |
| 50.00 | 240.0 |
| 55.00 | 240.0 |
| 60.00 | 240.0 |
| 65.00 | 283.9 |
| 70.00 | 350.9 |
| 75.00 | 463.6 |
| 80.00 | 691.1 |

Comparison of Gyro Compass Alignment Time

Figure 5:
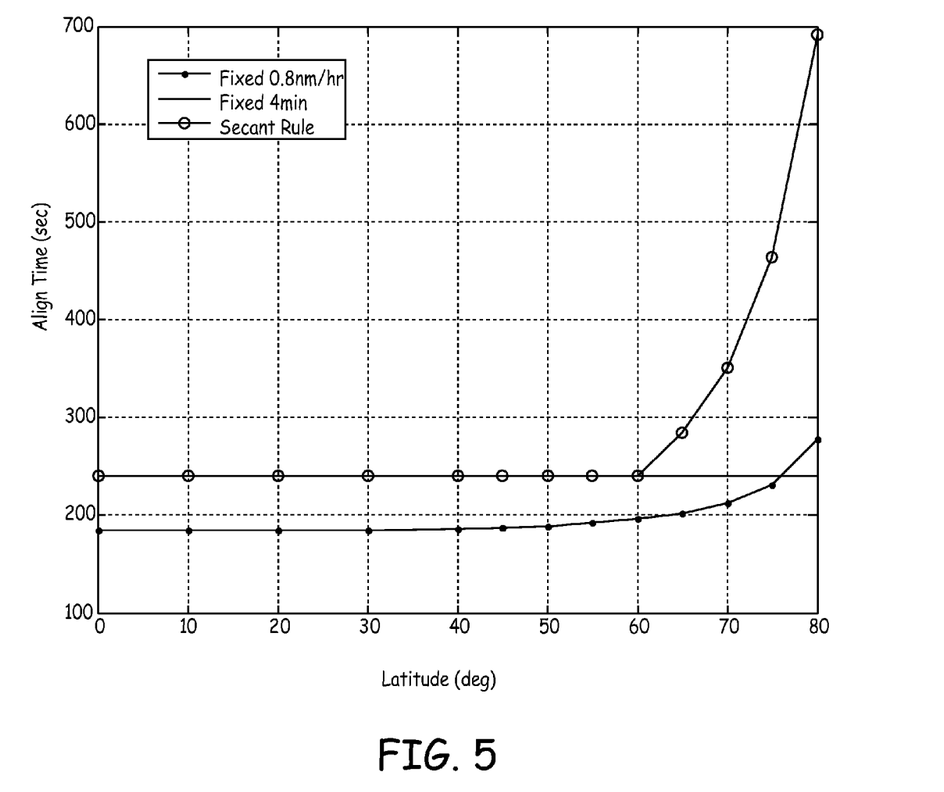
FIG. 5 is a graphical plot of a comparison of minimum alignment times to a four minute gyro-compassing alignment.

The foregoing simulations were designed to find a minimum required heading error at a given latitude. The simulations used a gyro compass process to perform the alignments so estimated values of the minimum gyro compass alignment times needed at each latitude was a free by-product. The graphical plot of FIG. 5 shows how the simulation alignment times needed to produce a fixed 0.8 nm/hr navigation run compared to the standard fixed 4 minute gyro compass alignment time and the Secant Rule. As shown in FIG. 5, for the trajectory used in the simulations, the minimum alignment time is under the 4 minute mark for most latitudes.

Practical Considerations

The present approach is intended to provide an optimized estimate of when an inertial navigator is sufficiently aligned to perform at a desired navigation drift rate. The data shown herein is only technically correct for the conditions modeled in the simulation. For systems operating under different conditions or using different quality inertial sensors the results will be different.

In operation, the system is going to be using its current estimate of heading error from its Kalman filter to make the determination of navigation readiness. The accuracy of that judgment is directly related to the accuracy of its heading error estimate. The simulation described herein is based on a true 1–σ heading error value. The operational Kalman filter has the much tougher job of estimating the correct heading uncertainty in real time as the alignment is taking place and is dependent on actual conditions being very close to the expected modeled conditions. It is prudent to allow a little conservatism in the model and consequently the Kalman filter will often estimate the heading error to be a little larger than it actually is. This becomes an issue when alignment time restraints and performance restraints get tight, since the heading error asymptotically approaches a minimum over time so the rate of heading convergence decreases as time progresses. For example, after four or five minutes the convergence rate slows drastically. In applications where an alignment time constraint is very close to the heading error convergence capability of the operational Kalman filter, it may be more effective to conclude alignment at the minimum time and test the operation heading error estimate with the "required" value for agreement within about 5% based on engineering judgment and knowledge of the system.

Instructions for carrying out the various process tasks, calculations, and generation of other data used in the operation of the method and system of the invention can be implemented in software, firmware, or other computer readable instructions. These instructions are typically stored on any appropriate computer readable storage medium used for storage of computer readable instructions or data structures. Such a computer readable storage medium can be any available media that can be accessed by a general purpose or special purpose computer or processor, or any programmable logic device.

Suitable computer readable storage media may include, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures.

The methods of the invention can be implemented by computer executable instructions, such as program modules, which are executed by a processor. Generally, program modules include routines, programs, objects, data components, data structures, algorithms, and the like, which perform particular tasks or implement particular abstract data types.

A computer or processor used in the present method and system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of navigation quality estimation, the method comprising:
   (a) obtaining an alignment observation;
   (b) comparing the alignment observation to a current heading estimate;
   (c) updating the current heading estimate based on the comparison;
   (d) updating a heading error estimate based on the updated current heading estimate;
   (e) determining an estimated drift rate based on the heading error estimate and an operational latitude, wherein the estimated drift rate is represented by a circular error probable rate that is calculated using the formula:

$$CEPR = x * \sigma_{Heading} * \cos(y * abs(\text{latitude}) + z),$$

wherein CEPR represents the circular error probable rate, $\sigma_{heading}$ represents the heading error estimate, abs(latitude) represents an absolute value of the operational latitude in degrees, and the x, y, z variables represent numerical values determined empirically and by interpolation of data;
   (f) determining if a drift rate requirement is met by the estimated drift rate; and
   (g) if the drift rate requirement is not met, repeating (a) to (f) until the drift rate requirement is met.

2. The method of claim 1, wherein the current heading estimate is obtained from one or more inertial sensors.

3. The method of claim 2, wherein the inertial sensors are part of an inertial navigation system.

4. The method of claim 2, wherein the inertial sensors comprise one or more gyroscopes, one or more accelerometers, or combinations thereof.

5. The method of claim 1, wherein the heading error estimate is updated by a Kalman filter.

6. The method of claim 5, wherein the estimated drift rate is a function of the heading error estimate from the Kalman filter and an absolute value of the operational latitude.

7. The method of claim 1, wherein the CEPR is calculated to have an upper boundary of about 5 nm/hr and a lower boundary of about 0.8 nm/hr.

8. A computer program product, comprising:
a computer readable medium having program instructions that are executable to implement a method of navigation quality estimation according to claim 1.

9. An inertial navigation system, comprising:
at least one processor;
one or more inertial sensors in operative communication with the processor; and
a computer readable medium having program instructions that are executable by the processor to implement a method of navigation quality estimation according to claim 1.

10. An apparatus for predicting navigation performance, comprising:
at least one processor;
at least one memory device in operative communication with the processor;
one or more inertial sensors in operative communication with the processor and the memory device;
a heading error estimation module configured to determine a heading error estimate based on input from the inertial sensors, the heading error estimation module comprising a Kalman filter; and
a heading error-drift rate correlation estimation module configured to determine an estimated drift rate based on the heading error estimate and an operational latitude.

11. The apparatus of claim 10, wherein the inertial sensors are part of an inertial navigation system.

12. The apparatus of claim 10, wherein the inertial sensors comprise one or more gyroscopes, one or more accelerometers, or combinations thereof.

13. The apparatus of claim 10, wherein the estimated drift rate is a function of the heading error estimate from the Kalman filter and an absolute value of the operational latitude.

14. The apparatus of claim 10, wherein the estimated drift rate is represented by a circular error probable rate that is calculated using the formula:

$$\text{CEPR} = x * \sigma_{Heading} * \cos(y * \text{abs}(\text{latitude}) + z),$$

wherein CEPR represents the circular error probable rate, $\sigma_{heading}$ represents the heading error estimate, abs(latitude) represents an absolute value of the operational latitude in degrees, and the x, y, z variables represent numerical values determined empirically and by interpolation of data.

15. The apparatus of claim 14, wherein the CEPR is calculated to have an upper boundary of about 5 nm/hr and a lower boundary of about 0.8 nm/hr.

16. The apparatus of claim 14, wherein the heading error-drift rate correlation estimation module comprises program instructions executable by the processor to:
(a) obtain an alignment observation;
(b) compare the alignment observation to a current heading estimate;
(c) update the current heading estimate based on the comparison;
(d) update a heading error estimate based on the updated current heading estimate;
(e) determine the estimated drift rate based on the heading error estimate and the operational latitude;
(f) determine if a drift rate requirement is met by the estimated drift rate; and
(g) if the drift rate requirement is not met, repeat (a) to (f) until the drift rate requirement is met.

17. An inertial navigation system comprising an apparatus for predicting navigation performance according to claim 10.

18. An inertial navigation system comprising an apparatus for predicting navigation performance according to claim 16.

19. A method of predicting inertial navigation performance, the method comprising:
creating a statistical model using simulation and analysis of inertial sensor quality, flight dynamics, and operational latitudes;
predicting navigation drift rate of an inertial navigation system using system error estimates and the statistical model;
monitoring heading error estimates of the inertial navigation system during alignment, the heading error estimates determined by a Kalman filter; and
predicting inertial drift rate performance based on current heading error estimates and a current operational latitude using the statistical model.

* * * * *